United States Patent [19]

Miyairi

[11] Patent Number: 5,158,265
[45] Date of Patent: Oct. 27, 1992

[54] BUTTERFLY VALVE
[75] Inventor: Kazuhiro Miyairi, Shizuoka, Japan
[73] Assignee: NBS Co., Ltd., Japan
[21] Appl. No.: 701,260
[22] Filed: May 16, 1991
[30] Foreign Application Priority Data
  May 31, 1990 [JP] Japan .................................. 2-142736
[51] Int. Cl.⁵ .............................................. F16K 1/22
[52] U.S. Cl. .................................... 251/305; 251/306
[58] Field of Search ................................ 251/305, 306
[56] References Cited
  U.S. PATENT DOCUMENTS
  3,957,073  5/1976  Barnum .
  3,960,177  6/1976  Baumann ...................... 251/305 X
  4,133,513  1/1979  Meyer ................................ 251/306
  4,712,768 12/1987  Herr et al. ...................... 251/306 X Primary Examiner—John C. Fox
Attorney, Agent, or Firm—Lowe, Price, LeBlanc & Becker

[57] ABSTRACT

At the outer-periphery contact portion of a butterfly disk of a butterfly valve, the sealing area closest to the shaft is formed smaller than other sealing areas. Thus, when the valve is closed by the butterfly disk, the outer-periphery contact portion of the butterfly disk almost simultaneously starts contacting a seat ring throughout the periphery because the area of the portion is smaller than other sealing areas. Therefore, the sealing effect for a long time is expected because the shaft is hardly scratched and the seat ring is hardly abraded.

4 Claims, 9 Drawing Sheets

BUTTERFLY VALVE

BACKGROUND OF THE INVENTION (1) Field of the Invention

The present invention relates to a butterfly valve in which the shaft connecting the butterfly disk consists of double or single eccentric structure.

(2) Description of the Prior Art

Figure 13:
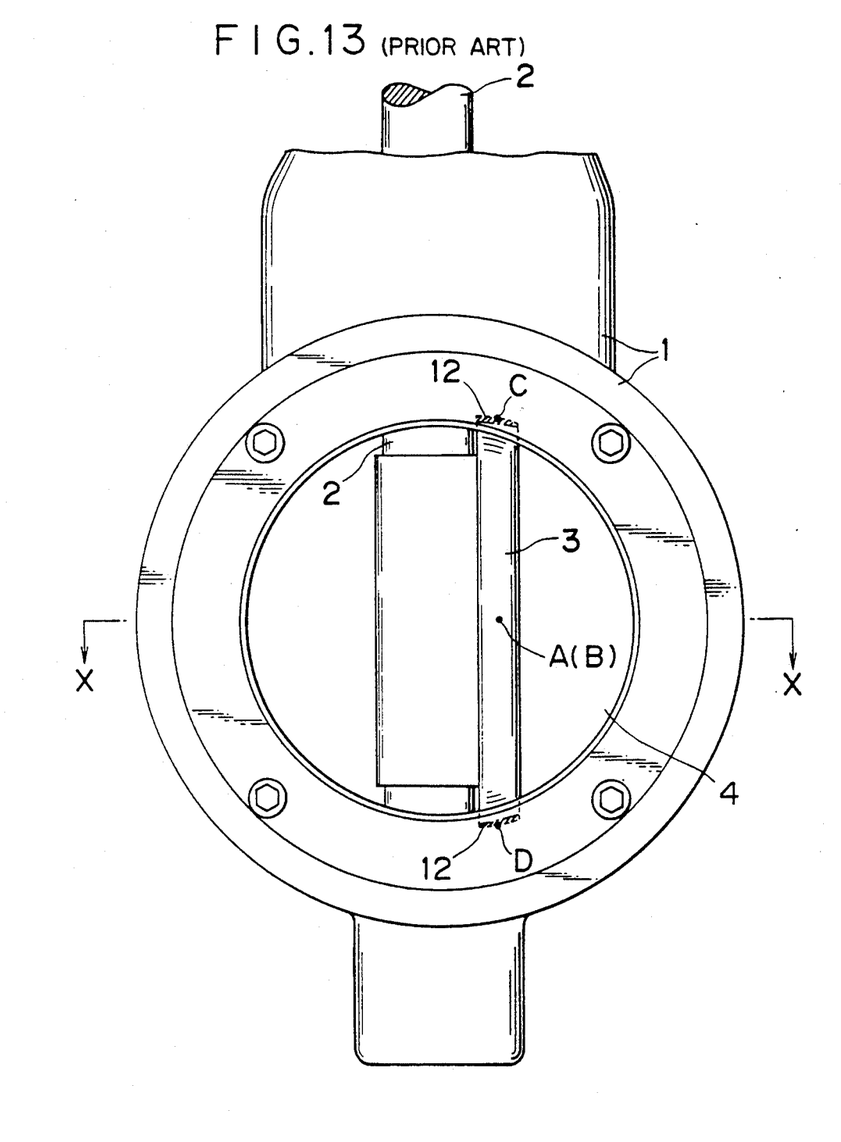
FIG. 13 is a front view of a general butterfly valve.
Figure 14:
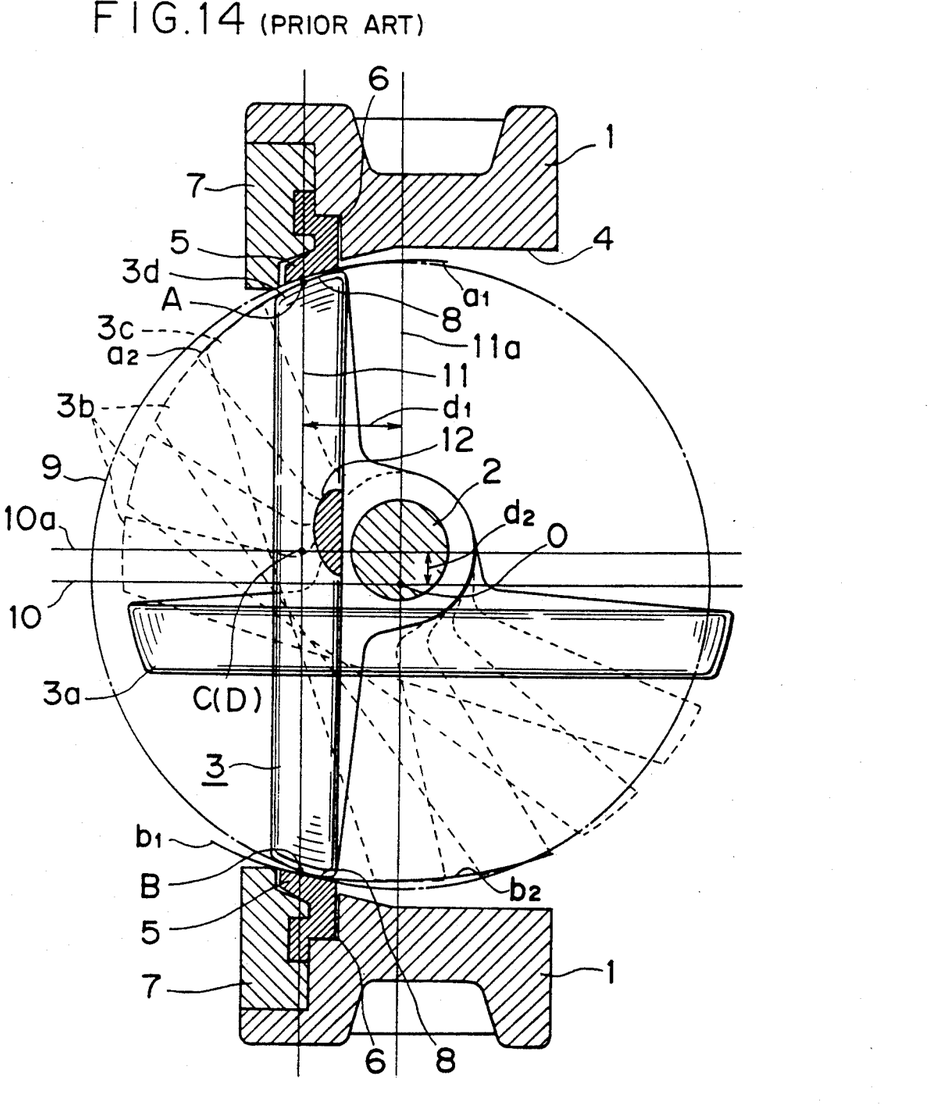
FIG. 14 is a sectional view along the line X—X in FIG. 13.

In general, a butterfly valve, as shown in FIG. 13 and FIG. 14 illustrating a sectional view along the line X—X (horizontal direction) of FIG. 13, opens or closes the through-hole 4 of the ring-shaped housing 1 by installing the shaft 2 consisting of double eccentric structure on the housing 1 perpendicularly to the tube axis 10, securing the butterfly disk 3 to the shaft 2, and flapping the butterfly disk 3 like a butterfly thorough rotation of the shaft 2.

Figure 15:
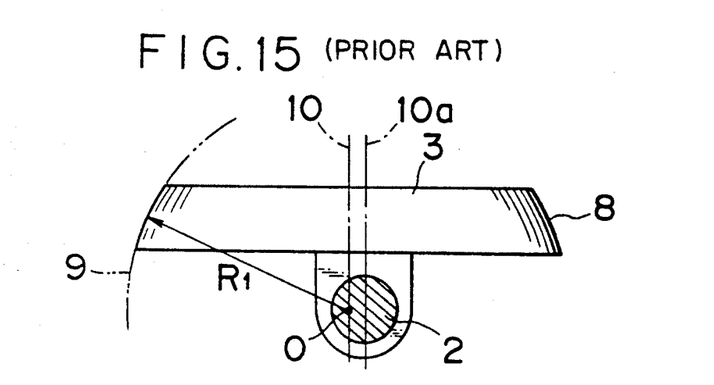
FIGS. 15, 16, and 17 are explanatory views of examples having different butterfly disk.

The seat ring 5 is installed on the inner periphery of the through-hole 4, which is held by the fitting recess 6 of the housing 1 and the seat holding ring 7. The contact surface 8 between the inner periphery of the seat ring 5 and the outer periphery of the butterfly disk 3 is formed to be a circular arc having a slight taper as shown in FIG. 15, forming the circular locus 9 with the radius R1 centering around the point 0 where the circular locus 9 of the circular arc intersects the center line 10 of the butterfly disk 3. The shape of the contact surface of the butterfly disk 3 is not restricted to the example in FIG. 15. There are also the shapes of a complete circular cone as shown in FIG. 16 and the shape in which the radius R2 of the circular arc is small, R2LR1, as shown in FIG. 17.

Figure 16:
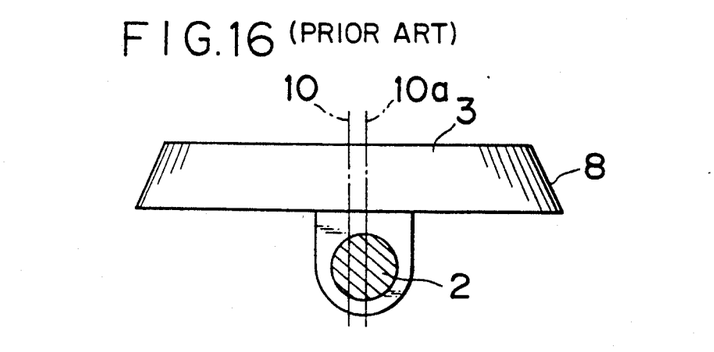
Figure 17:
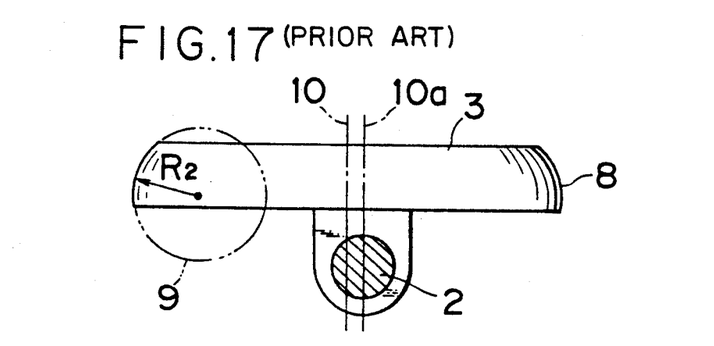

Though the following is the description of the example in FIG. 15, the description can also be applied to the examples in FIGS. 16 and 17.

The double eccentric structure of the shaft 2 is defined as the structure in which the shaft 2 has the eccentricity 11a equal to the distance "d1" from the central contact surface 11 of the butterfly disk 3 (primary eccentricity) and the eccentricity 10a equal to the distance d2 from the tube axis 10 of the point 0 (secondary eccentricity).

Though the following is the description of the case in which the central point of the shaft 2 consists of double eccentric structure, the description can also be applied to the so-called single eccentric structure with the eccentricity of "d1" (primary eccentricity) and free from double eccentricity (d2=0).

When the shaft 2 having the above double eccentricity rotates, the contact points A an B of the butterfly disk 3 rotates along the lock (a1-A-a2) and (b1-B-b2) shown by the continuous line different from the circular locus 9. That is, when the closed butterfly disk 3 opens, the contact point A rotates while slightly shifting from the point A to the point a2 and the contact point B rotates while slightly shifting from the point B to the point b2 toward the inside of the locus 9. Therefore, the contact points A and B of the butterfly disk 3 do not cause unnecessary sliding because they are diagonally separated from the seat ring 5 without sliding on it. When the opened butterfly disk 3 closes, the contact points A and B contact at the intersections A and B with the circular locus 9 before they shift from the contact points a2 and b2 toward the outside points a1 and b1 contact points A an B so that they will cross each other. Therefore, the bearing pressure of the butterfly disk 3 increases and airtightness is improved. However, if rotation becomes excessive after contacting at the points A and B, the torque excessively increases and the seat ring damages. Therefore, a stopper is normally installed to control rotation.

The butterfly valve consisting of the above double eccentric structure smoothly opens or closes and the airtightness is improved. However, it has the following disadvantages. That is, when the butterfly disk 3 opens or closes, the effect of double eccentric structure is remarkably shown around the side portions A and B shown in the top view of FIG. 14. However, because the butterfly disk 3 rotates while contacting with the seat ring 5 around the top and bottom contact points C and D of the butterfly disk 3, there is a problem that abnormal scratches shown by the hatched are 12 in FIGS. 13 and 14 are produced at the top and bottom contact points C and D of the butterfly disk 3 and the seat ring 5 locally abrades to decrease the sealing effect.

U.S. Pat. No. 3,957,073 shows the description that "Peripheral portions on each side of the vane 53 are shaved adjacent the pin position to accommodate for the thickness to the vane 53 when it moves toward closed positions". However, the description does not include how the cut portion contacts the seat ring and the problem is left that it is unknown whether or not a long term sealing effect can be obtained.

It is the first object of the present invention to provide a butterfly valve capable of obtaining stable sealing effect for a long time by minimizing scratches of the butterfly disk and abrasion of the seat ring.

Other objects and features of the present invention will be clarified by the following description.

BRIEF SUMMARY OF THE INVENTION

In a butterfly valve in which a butterfly disk opens or closes by rotating it with a shaft connected with the butterfly disk and marking the outer-periphery contact portion of a butterfly disk contact with or separate from a seat ring at the through-hole of the housing, the sealing area at least around the shaft is formed smaller than other sealing areas at the outer-periphery contact portion of the butterfly disk. Therefore, when the valve is closed by the butterfly disk, the portion close to the shaft which will earliest contact the seat ring almost simultaneously starts contacting the seat ring throughout the periphery because the are of the portion is formed smaller than other sealing areas. Thus, scratches around the shaft and abrasion of the seat ring are decreased and the sealing effect is maintained for a long time.

DETAILED DESCRIPTION

Embodiments of the present invention are described below according to FIGS. 1 through 12.

Firstly, the mechanism is described according to FIG. 14, where the outer-periphery contact portion 8 of the butterfly disk 3 contacts the seat ring 5 when the butterfly disk 3 opens or closes.

In this case, it is assumed that the shaft 2 consists of double eccentric structure as shown in FIG. 14.

(1) Under the continuous-line state 3a when the butterfly disk 3 perpendicularly opens, the seat ring 5 does not contact the butterfly disk 3 at all.

(2) Under the dotted-line state 3b when the butterfly disk 3 rotates by 30° to 50°, the top C and the bottom D of the butterfly disk 3 start contacting the seat ring 5.

(3) Under the states of 3b to 3c when the butterfly disk 3 rotates at the angle of 30° to 75°, the contact portion 8 between the butterfly disk 3 and the seat ring 5 slowly moves from the top C and the bottom D to the horizontal portions A and B.

(4) Under the continuous-line state 3d when the butterfly disk 3 rotates by 90°, the valve completely closes.

From the above mentioned, it is preferable that portions other than the horizontal portion of the butterfly disk 3 do not contact the seat ring 5 until the horizontal portions A and B of the outer-periphery contact portion 8 of the butterfly disk 3 start contacting the seat ring 5. Therefore, in the present invention, the sealing area at the outer periphery of the butterfly disk 3 forms the notches 13 and 14 at the top and bottom of the outer periphery 8 of the butterfly disk as shown by the hatched area in FIGS. 1 and 2. The notches 13 and 14 are approximately formed into a circular arc so that the sealing area will becomes small around the shaft 2, that is, the highest portion of the outer periphery 8 of the butterfly disk 3 at the side of the shaft 2 will be scraped by passing through the secondary eccentric shaft 10a.

Figure 1:
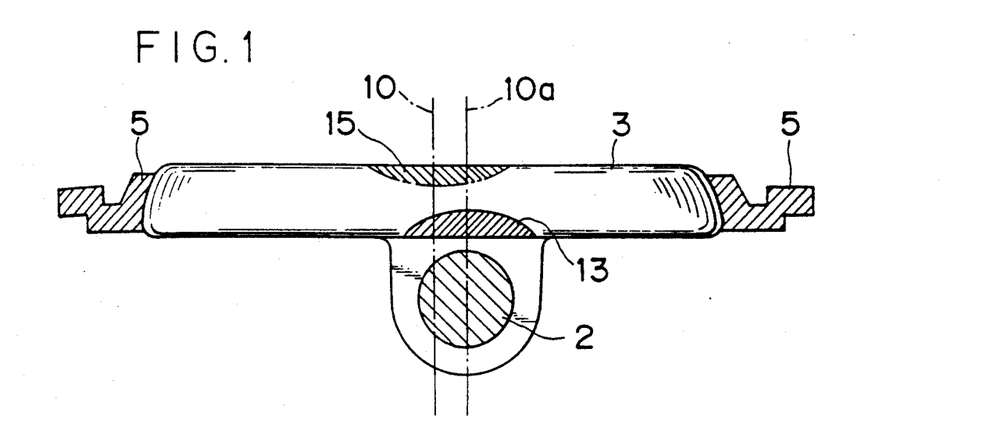
FIG. 1 is a top view showing the first embodiment of the butterfly valve according to the present invention.
Figure 2:
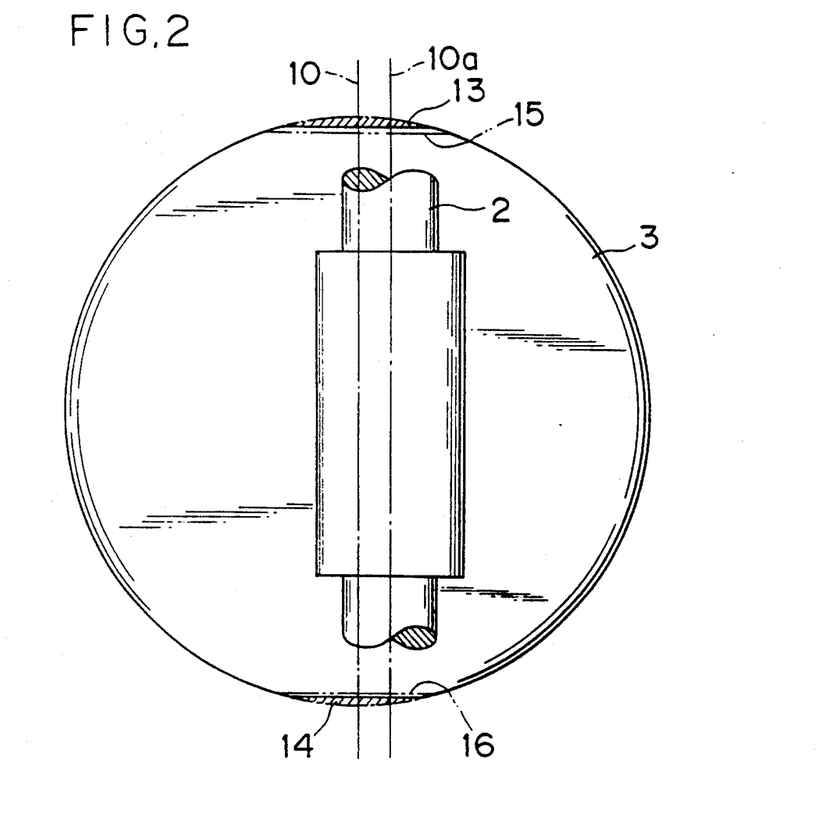
FIG. 2 is a front view of FIG. 1.

The notches 13 and 14 are not restricted to the shapes in FIGS. 1 and 2. They can also be provided with the shapes in FIGS. 3 through 12.

These embodiments are described below.

Figure 3:
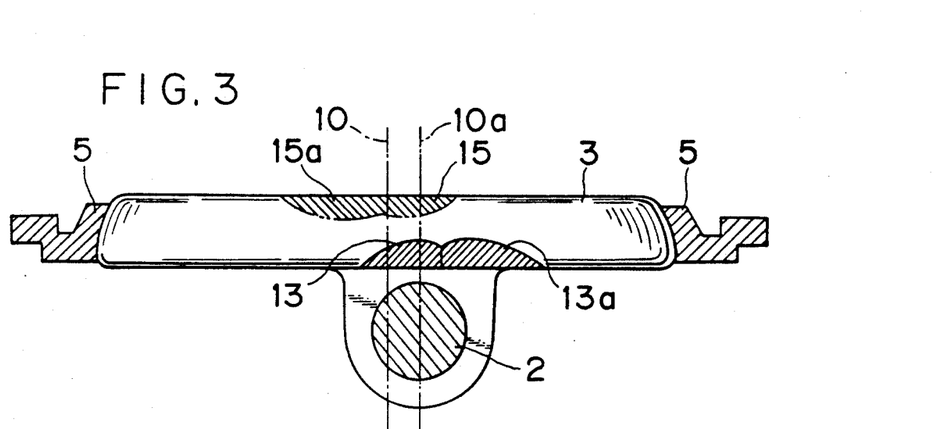
FIG. 3 is a top view showing the second embodiment of the butterfly valve according to the present invention.
Figure 4:
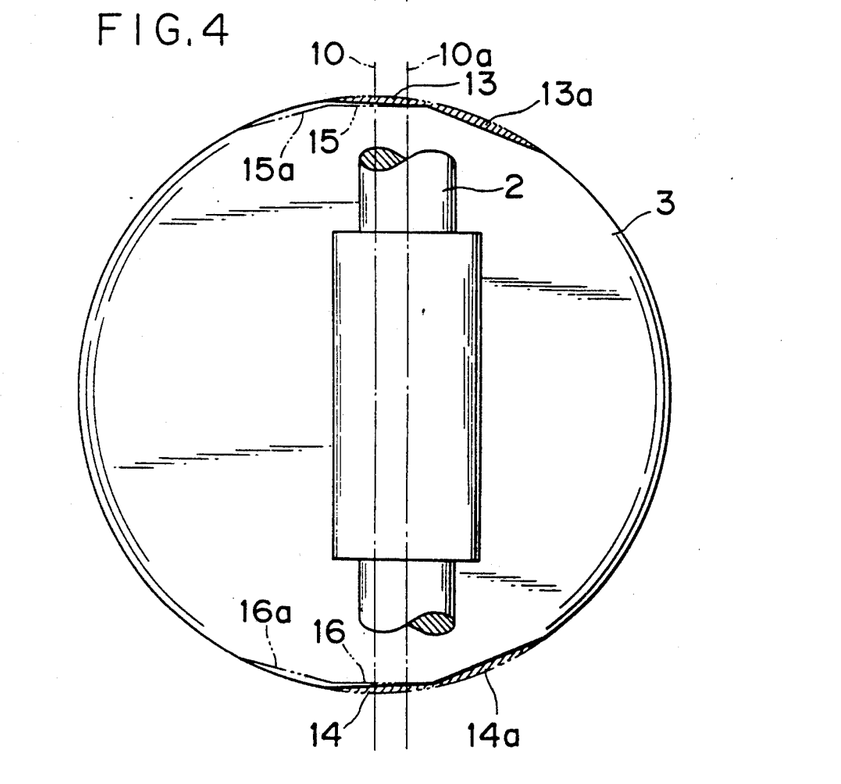
FIG. 4 is a front view of FIG. 3.

FIGS. 3 and 4 shows an embodiment where the notches 13a and 14a are continuously added to one side in addition to the notches 13 and 14 for double-surface cutting. Because the butterfly disk 3 rotates by 90° or less, it is only necessary to form the notches 13a and 14a to be added at one end (right side for the illustrated embodiment).

Figure 5:
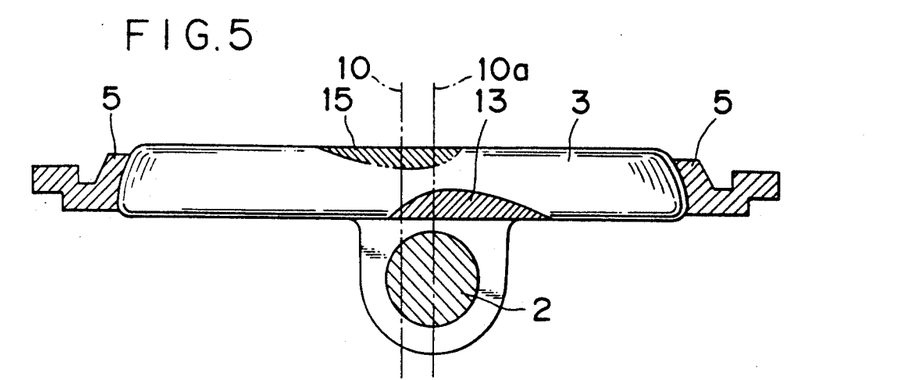
FIG. 5 is a top view showing the third embodiment of the butterfly valve according to the present invention.
Figure 6:
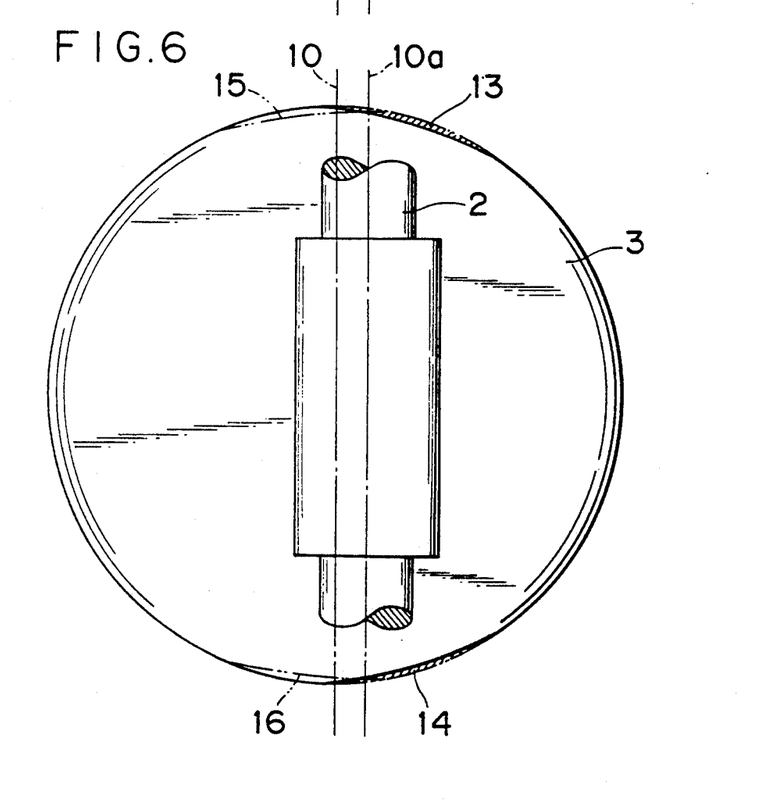
FIG. 6 is a front view of FIG. 5.

FIGS. 5 and 6 shows an embodiment where the notches 13 and 14 are lengthened at one end (right side for the illustrated embodiment) through single-surface cutting.

Figure 7:
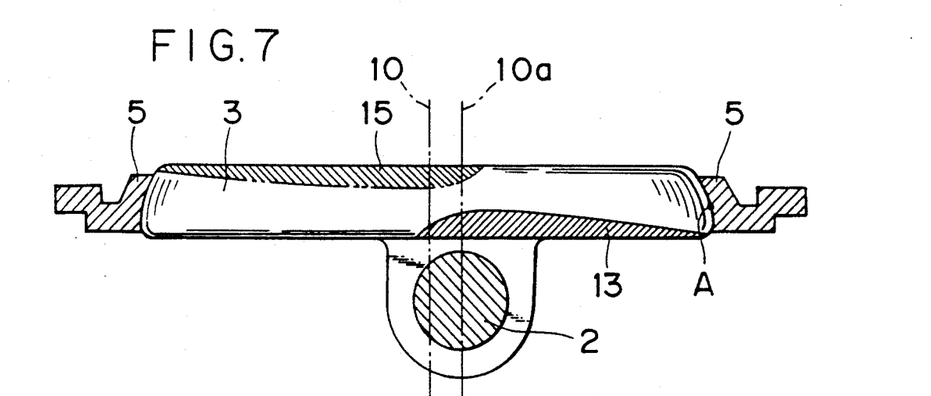
FIG. 7 is a top view showing the fourth embodiment of the butterfly valve according to the present invention.
Figure 8:
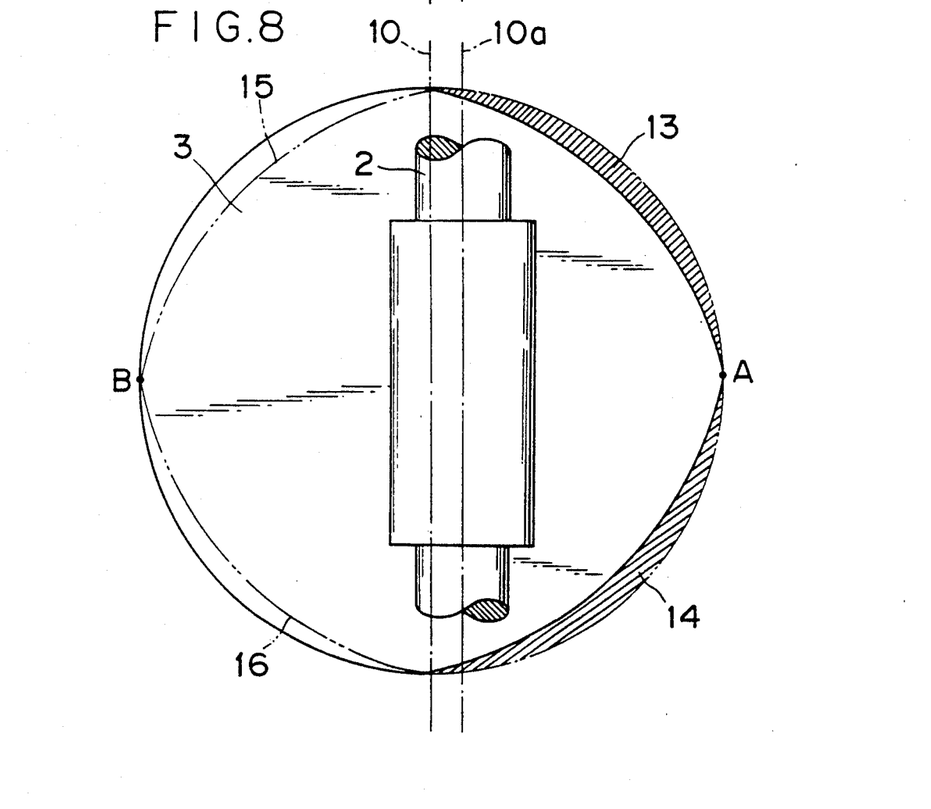
FIG. 8 is a front view of FIG. 7.

FIGS. 7 and 8 show an embodiment where the notches 13 and 14 are extended up to the point A at one end (right side for the illustrated embodiment) so that they will gradually be thinned.

Figure 9:
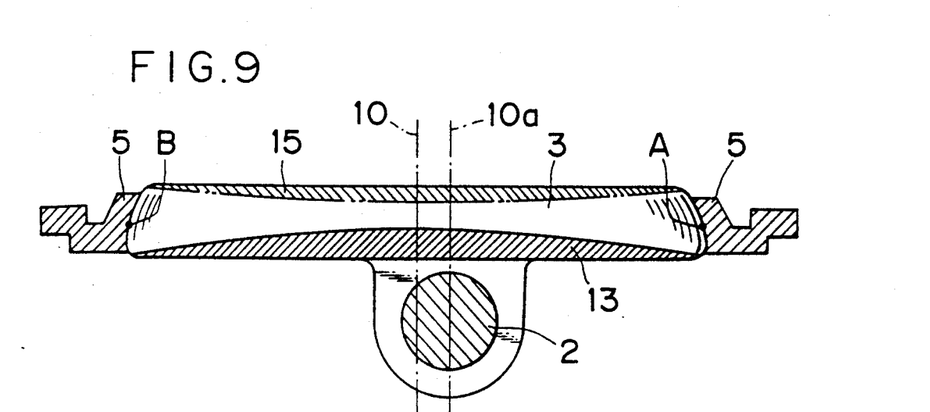
FIG. 9 is a top view showing the fifth embodiment of the butterfly valve according to the present invention.
Figure 10:
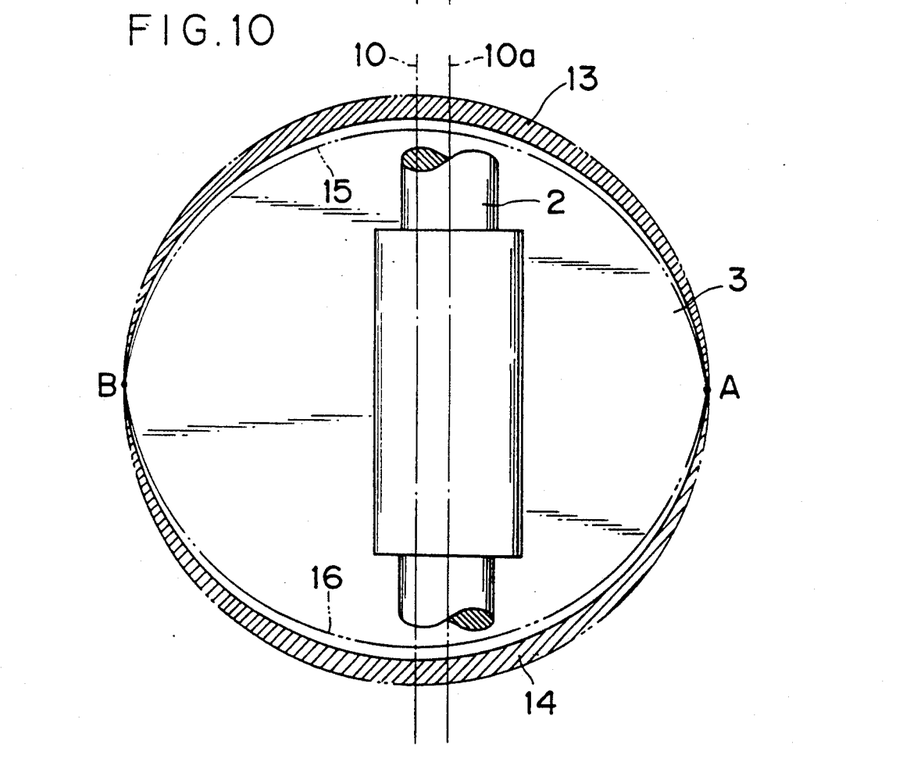
FIG. 10 is a front view of FIG. 9.

FIGS. 9 and 10 show an embodiment where the notches 13 and 14 are extended up to the points A and B at the both ends so that they will gradually be thinned.

Figure 11:
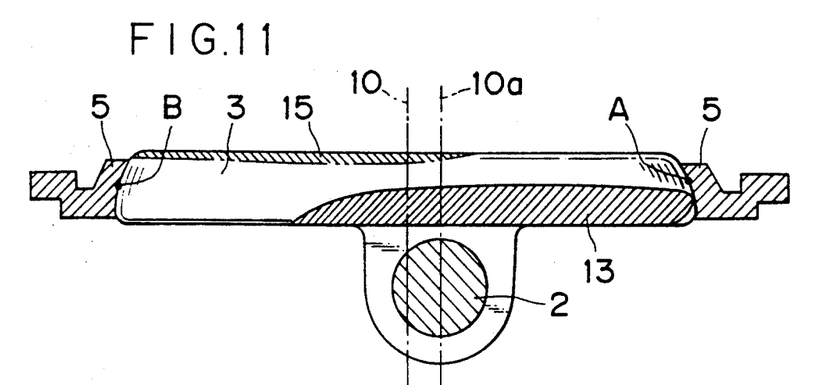
FIG. 11 is a top view showing the sixth embodiment of the butterfly valve according to the present invention.
Figure 12:
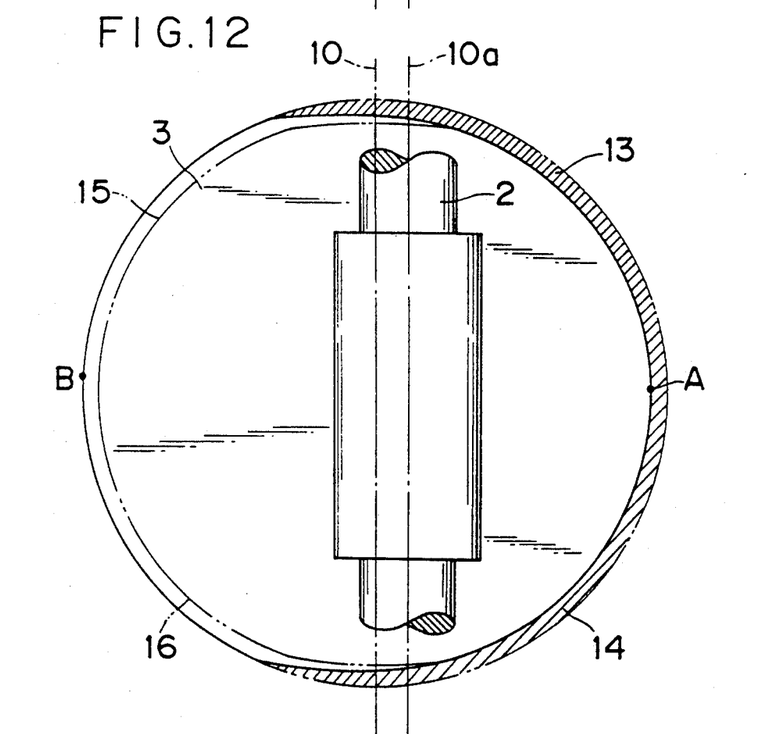
FIG. 12 is a front view of FIG. 11.

FIGS. 11 and 12 show an embodiment where the notches 13 and 14 are formed at one end (half periphery for the illustrated embodiment) with approximately the same width.

For the embodiments in FIGS. 1 through 12, the notches 13, 13a, 14, and 14a are set on a high portion of the periphery at the shaft-2 side of the butterfly disk 3. However, it is also possible to set the notches on a low portion of the periphery at the opposite side. That is, in FIGS. 1 through 12, the notches 15, 15a, 16, and 16a shown by a chain line can be set on the periphery at the opposite side to the shaft 2 of the butterfly disk 3.

What is claimed is:

1. A butterfly valve, comprising a housing containing a through-opening; a butterfly disk which is opened or closed by rotation of the butterfly disk on a shaft connected to the housing so that contact between an outer periphery contact portion of the butterfly disk with a sealing surface of a seat ring mounted at the through-opening of the housing results in closure of the through-opening, wherein at least a first pair of notches are respectively formed on the contact portion adjacent each other in respect of contact with opposing faces of the disk and cooperating with each other so that the remaining sealing area between the notches is smaller than other sealing areas adjacent thereto on the contact portion, said first pair formed adjacent one end of the shaft and a second pair of notches, substantially identical to the first pair, formed at the other end of the shaft such that both said sealing areas between the respective notches are the smallest sealing areas on the contact portions to minimize the sealing area around the shaft and avoid disk abrasion, said notches each extending along the contact portion through about 90°.

2. The butterfly valve of claim 1, wherein said shaft is parallel and offset from the disk so that said disk is eccentrically mounted on and relative to said shaft.

3. The butterfly valve of claim 1, wherein each notch is gradually tapered in the direction extending away from the longitudinal axis of the shaft.

4. The butterfly valve of claim 3, wherein the degree of taper is such that the disk provides a seal only when the disk is rotated on the shaft through a sufficient angular interval so that it contacts the sealing surface of the seat ring along all points of the contact portion at about the same time.

* * * * *